United States Patent [19]

Taira-Griffin

[11] Patent Number: 5,682,449
[45] Date of Patent: Oct. 28, 1997

[54] SHARP ANGLE FIBER OPTIC INTERCONNECTION SYSTEM

[75] Inventor: Laurie Keiko Taira-Griffin, Huntington Beach, Calif.

[73] Assignee: Packard Hughes Interconnect Company, Irvine, Calif.

[21] Appl. No.: 577,609

[22] Filed: Dec. 22, 1995

[51] Int. Cl.$^6$ ............................................. G02B 6/26
[52] U.S. Cl. ................................................. 385/47
[58] Field of Search ........................... 385/31–34, 39, 385/47, 147

[56] References Cited

U.S. PATENT DOCUMENTS

| | | | |
|---|---|---|---|
| 546,707 | 10/1895 | Nakata et al. | 385/33 X |
| 3,626,170 | 12/1971 | Schwan | 240/1.4 |
| 3,807,870 | 4/1974 | Kalman | 356/161 |
| 4,302,069 | 11/1981 | Niemi | 385/47 |
| 4,355,864 | 10/1982 | Soref | 350/96.18 |
| 4,575,180 | 3/1986 | Chang | 385/47 |
| 4,639,255 | 1/1987 | Gouali et al. | 385/47 X |
| 4,708,423 | 11/1987 | Erman et al. | 385/47 X |
| 4,931,636 | 6/1990 | Huggins | 250/226 |
| 4,963,984 | 10/1990 | Womack | 358/225 |
| 5,030,207 | 7/1991 | Mersch et al. | 604/168 |
| 5,325,459 | 6/1994 | Schimidt | 385/47 X |
| 5,357,592 | 10/1994 | Neilson | 385/47 |
| 5,380,317 | 1/1995 | Everett et al. | 606/15 |
| 5,404,414 | 4/1995 | Avelange et al. | 385/47 X |
| 5,519,797 | 5/1996 | Chambaret et al. | 385/33 X |
| 5,537,500 | 7/1996 | Yokoyama | 385/47 X |
| 5,539,577 | 7/1996 | Si et al. | 385/47 X |

*Primary Examiner*—Akm E. Ullah
*Attorney, Agent, or Firm*—Cary W. Brooks

[57] ABSTRACT

The present invention includes a fiber optic interconnection system utilizing a relatively small space for interconnection between two fiber optic termini which are not approaching each other axially but are at an angle which may be acute. The system according to the present invention allows light rays to expand from one fiber optic terminus through a lens, reflecting off the back of the lens and through the other fiber optic terminus. The expansion and contraction of the light rays is dependent upon the refractive indices of the cores of the fiber optic lines, the medium and the lens. The interconnection system allows two fiber optic termini to mate in a very small area while traversing a sharp angle. The fiber optic interconnection system provides an interface at an acute angle, such as 90 degrees, rather than butt mating of two termini and forcibly bending the fibers extending from the rear of the terminus bodies.

12 Claims, 1 Drawing Sheet

SHARP ANGLE FIBER OPTIC INTERCONNECTION SYSTEM

FIELD OF THE INVENTION

This invention relates to a fiber optic interconnection system for two or more fiber optic lines at sharp angles such as 90 degrees or less.

BACKGROUND OF THE INVENTION

Heretofore, fiber optic interconnects required a certain amount of space at the rear of the interconnect body to prevent any bending of wires feeding optical signals from one terminus to another terminus. If a bend in an optical fiber is present, the light "leaks" from the core into the cladding causing increased insertion loss. Thus, heretofore, a minimum bend radius of the fiber had been a key specification when designing any fiber optic interconnection system.

The present invention provides advantages over the prior art.

SUMMARY OF THE INVENTION

The present invention includes a fiber optic interconnection system utilizing a relatively small space for interconnection between two or more fiber optic termini which are not approaching each other axially but are at an angle which may be acute. The system according to the present invention allows light rays to expand from one fiber optic terminus through a lens, reflecting off the back of the lens and through the other fiber optic terminus. The expansion and contraction of the light rays is dependent upon the refractive indices of the cores of the fiber optic lines, the medium through which the light passes such as air and/or the lens. The interconnection system allows two fiber optic termini to mate in a very small area while traversing a sharp angle. The fiber optic interconnection system provides an interface at an acute angle, such as 90 degrees or less, rather than butt mating of two termini and forcibly bending the fibers extending from the rear of the terminus bodies.

DETAILED DESCRIPTION

Figure 1:
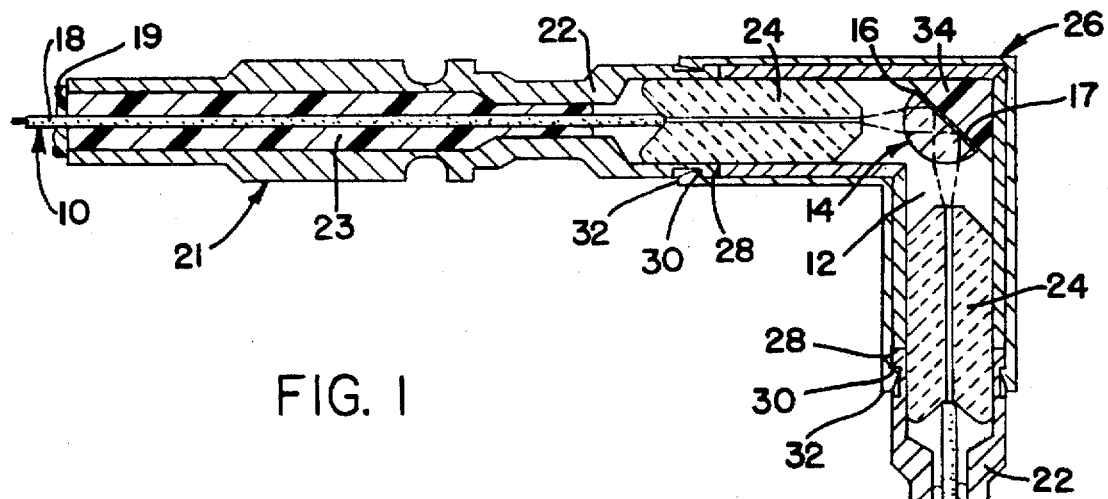
FIGS. 1 and 2 illustrate a fiber optic interconnection systems according to the present invention.
Figure 2:
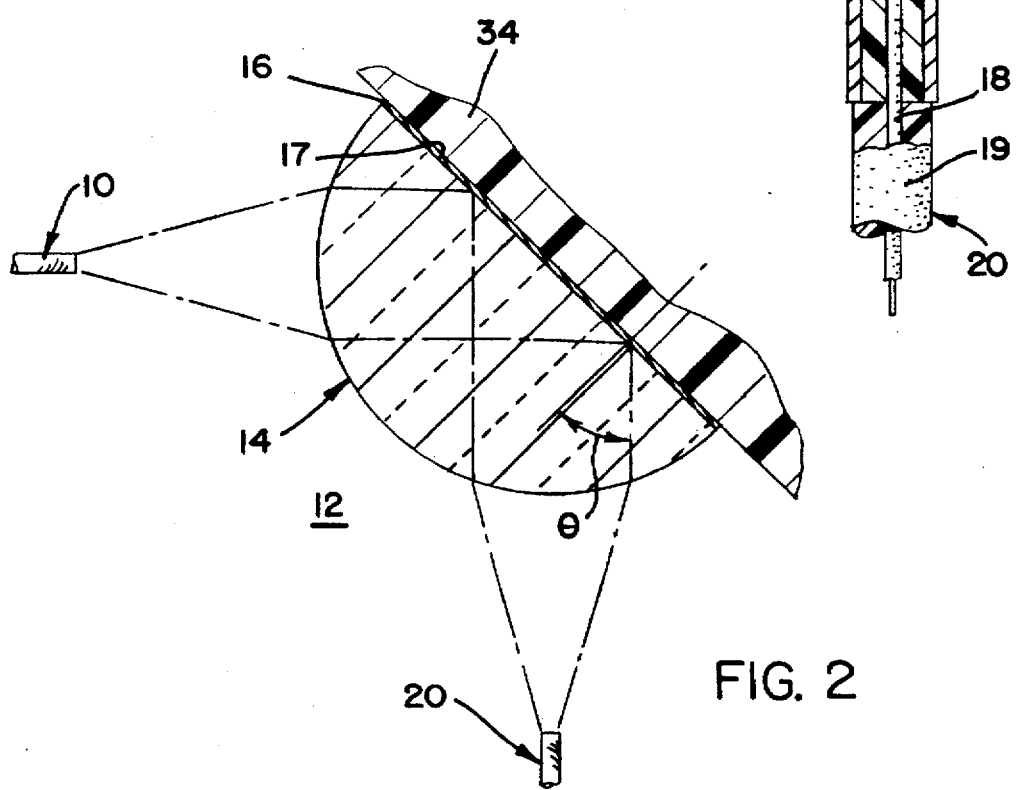

FIG. 1 illustrates a fiber optic interconnection system according to the present invention including a first fiber optic line 10 having a core and cladding (not shown) and a second fiber optic line 20 also having a core and cladding. Light emerges from the core of the first fiber optic line and expands in the medium 12 in which the two lines are connected. Preferably such medium is air. The expanded light enters a lens 14 which preferably has hemisphere shape. If the lens is made from silica or the like, a reflective coating 16 is provided on a flat backside 17 of the lens. The light bounces off the reflective coating and exits the lens. The reflective coating may be made by nickel, gold or any reflective material plated on the flat face of the hemisphere lens. However, if the lens is made from sapphire or the like, a reflective coating may not be needed because the system is utilized at the critical angle that produces total internal reflection. As shown in FIG. 2, $\theta$ is the angle of incidence normal to the flat surface 17 of the hemisphere. For total reflection $\sin \theta_c = n_2/n_1$, where $\theta_c$ is the critical angle, for sapphire $n_1=1.77$ for air $n_2=1.0$. If $\theta > \theta_c$ then no reflective coating is required because there will be total internal reflection.

The light from the first fiber optic line 10 contracts when it enters the lens and contracts further as it exits the lens. The contraction of the lights by the lens allows the light to enter the second fiber optic line 20 with minimal or no loss. The expansion and contraction of the light rays depend on the refractive indices of the fiber optic core which is preferably silica, the air and the hemisphere lens.

The hemisphere lens attempts to accumulate the light beam emitted from one fiber optic bringing the rays back to a more near parallel direction after having been expanded when entering air. The two lens may be connected at a variety of angles to each other and do not necessarily have to be connected at right angles. Using ray traces one can determine and position lens with respect to each other using a lens according to the present invention.

FIG. 1 illustrates a right angle fiber optic interconnection system according to the present invention wherein first and second fiber optic lines 10, 20 are connected together at right angles. The first fiber optic lines 10, 20 includes an optic fiber having a core and cladding (not shown), a buffer 18 and/or jacket 19 of nylon or Teflon™ surrounding the fiber, and a terminus body 21 surrounding one end of the fiber optic line. The gap or space between the terminus body 21 and the fiber optic lines 10, 20 is filled with an epoxy 23. The terminus body has a first end 22 which receives a portion of ferrule 24 that also carries the fiber optic line without the buffer or jacket. The first end 22 of the terminus body is received in an alignment sleeve 26 preferably having a right angle shape. The first end 22 of the terminus body butts up against a stop 28 within the alignment sleeve to insure proper positioning of the end of the fiber optic line from the lens. The first end 22 of the terminus body and the alignment may include press fit clips 30, 32 respectively for holding the pieces together. The hemisphere shaped lens 14 is positioned a distance from the end of the fiber optic line and so that the flat face of the lens is at a 45 degree angle to the longitudinal axis of the fiber optic line. The lens may be secured to a right angle wedge 34 position in the corner of the alignment sleeve.

By way of example, a fiber optic interconnection system according to the present invention may include fiber optic lines (multimode 62.5 micron fiber), a sapphire hemisphere lens having a refractive index of 1.77, and a diameter of 3,175 mm may be placed so that the flat face of the hemisphere lens is at a 45 degree angle to the longitudinal axis of each fiber optic line positioned at right angles to each other. The distance of the fiber optic core to the outer edge of the hemisphere lens is 1.5875 mm. Under the conditions, light may be transferred from one fiber optic line to the other with minimum or no loss.

According to the present invention the reflective back of the lens may be flat or may include two or more flat or curved reflective surfaces. Accordingly, the two fiber optic lines may be positioned at a variety of angle positions with respect to each other for example at 135 to 90 degrees or less with respect to each other.

What is claimed is:

1. A fiber optic interconnection system including a first and second fiber optic line, a lens having a flat face carried thereon, said first and second fiber optic line each being spaced a distance from said lens so that light waves emitted from one fiber optic line expands upon leaving the fiber optic line in the medium in which the fiber optic line is positioned, enters the lens and contracts, and is reflected to exit the lens into the media, said light contracting upon exiting the lens to enter the second fiber optic and to provide an angled fiber optic interconnection.

2. A fiber optic system as set forth in claim 1 wherein the lens includes a reflective coating material on the flat face.

3. A fiber optic system as set forth in claim 2 wherein the reflective coating material includes a metal.

4. A fiber optic system as set forth in claim 1 wherein the lens includes sapphire and there is no reflective coating material on the flat face.

5. A fiber optic system as set forth in claim 1 wherein said first and second fiber optic line each are positioned a distance from said lens so that there is nominal light loss between said lines.

6. A fiber optic system as set forth in claim 1 wherein said fiber optic lines are positioned at approximately 90 degrees to each other.

7. A fiber optic interconnection system as set forth in claim 1 having only a single lens.

8. A fiber optic interconnection system as set forth in claim 7 wherein said lens has a semi-spherical shape.

9. A fiber optic interconnection system as set forth in claim 8 wherein said lens consists of sapphire.

10. A fiber optic interconnection system as set forth in claim 9 wherein there is no reflective coating material on the flat face.

11. A fiber optic interconnection system as set forth in claim 10 wherein the fiber optic lines are positioned at approximately 90 degrees to each other.

12. A fiber optic interconnection system including a first and second fiber optic line, a lens having a flat face carried thereon, said first and second fiber optic line each being spaced a distance from said lens so that light waves emitted from one fiber optic line expands upon leaving the fiber optic line in the medium in which the fiber optic line is positioned, enters the lens and contracts, and is reflected to exit the lens into the media, said light contracting upon exiting the lens to enter the second fiber optic and to provide an angled fiber optic interconnection, and wherein said first and second fiber optic line each are positioned a distance from said lens so that there is nominal light loss between said lines and wherein each of said fiber optic line is a multimode 62.5 micron fiber, said sapphire hemisphere lens has a refractive index of 1.77 and a diameter of 3.175 mm, said lens having a flat face positioned at a 45 degree angle to the longitudinal axis of each of said fiber optic lines, and an end of each fiber optic line being spaced a distance of 1.5875 mm from an outer surface of said lens.

* * * * *